Jan. 14, 1969        L. B. McKAY        3,421,460
ROBBERY PREVENTION DEVICE
Filed Aug. 8, 1967        Sheet _1_ of 4
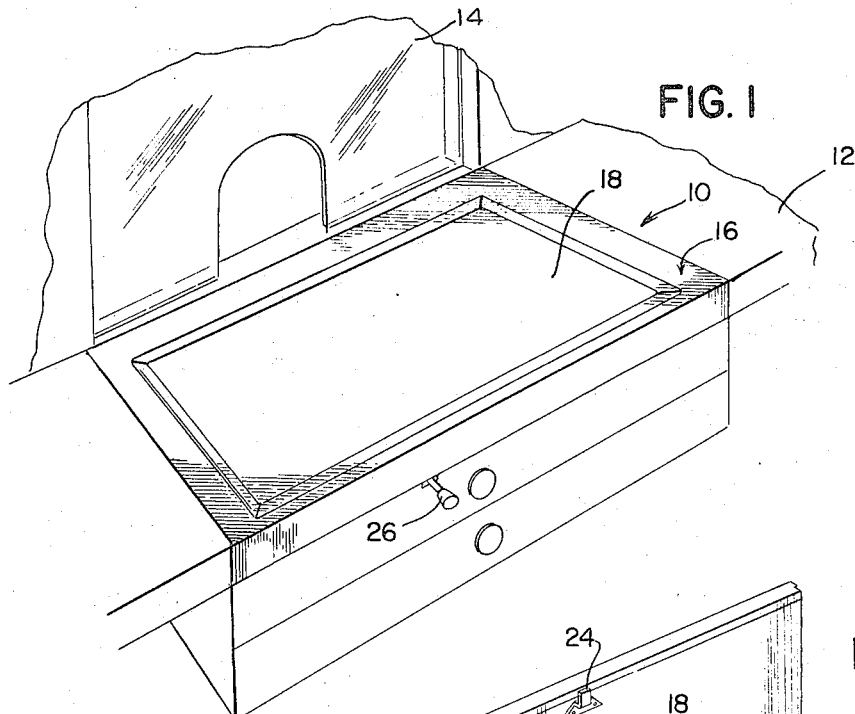
FIG. 1
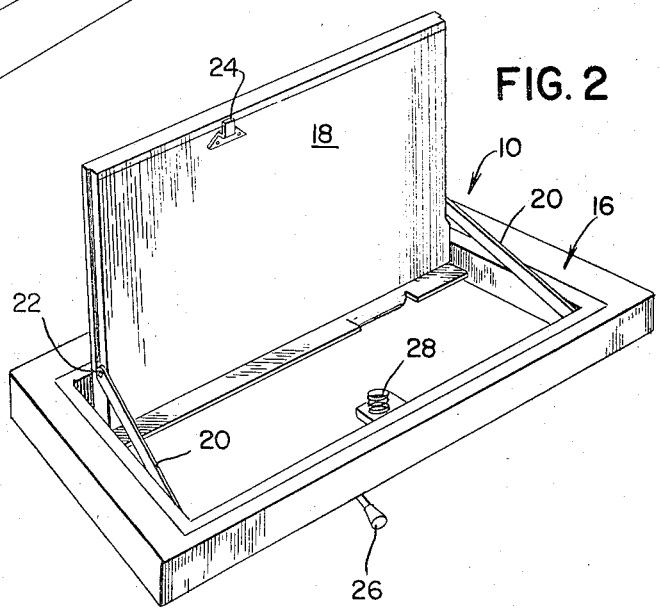
FIG. 2
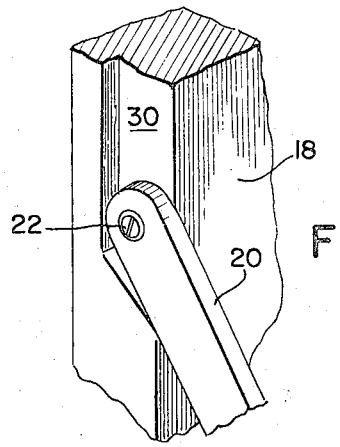
FIG. 3
INVENTOR
LAWRENCE B. McKAY
ATTORNEY

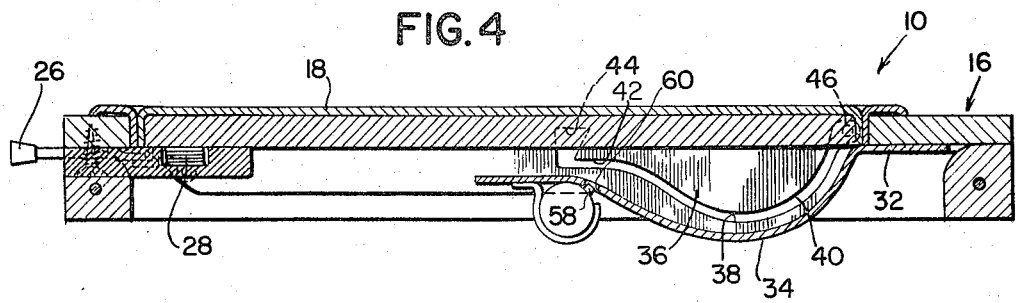
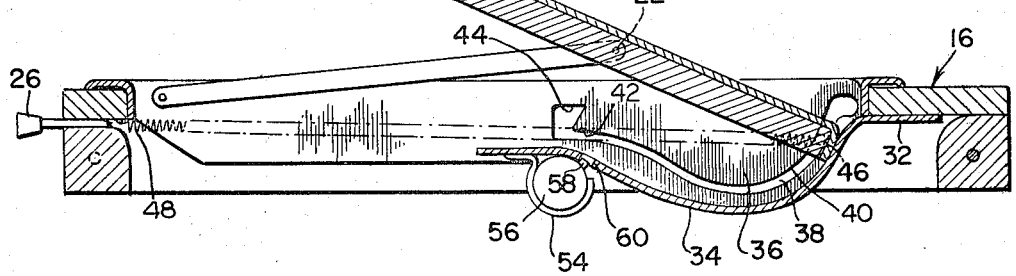
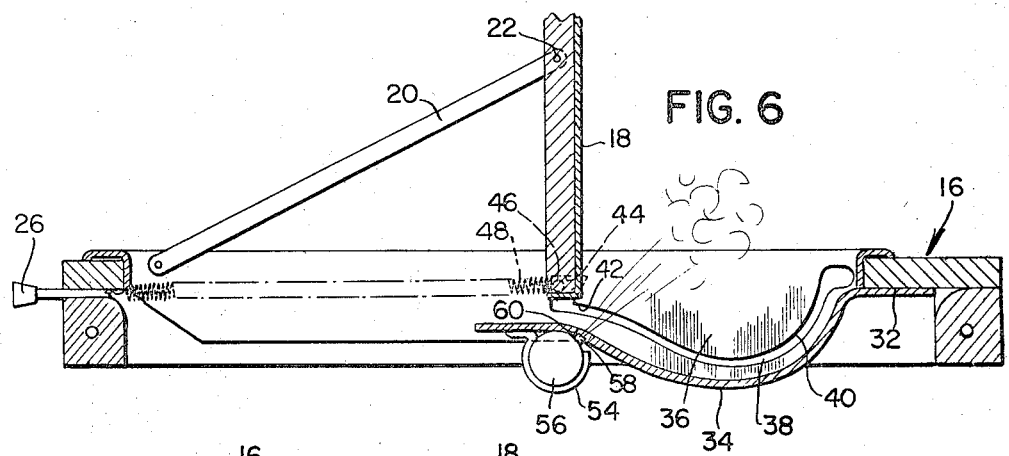
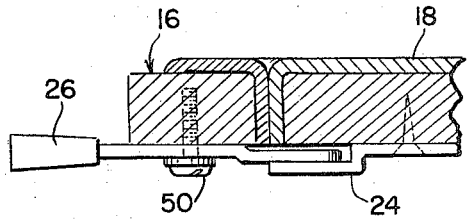

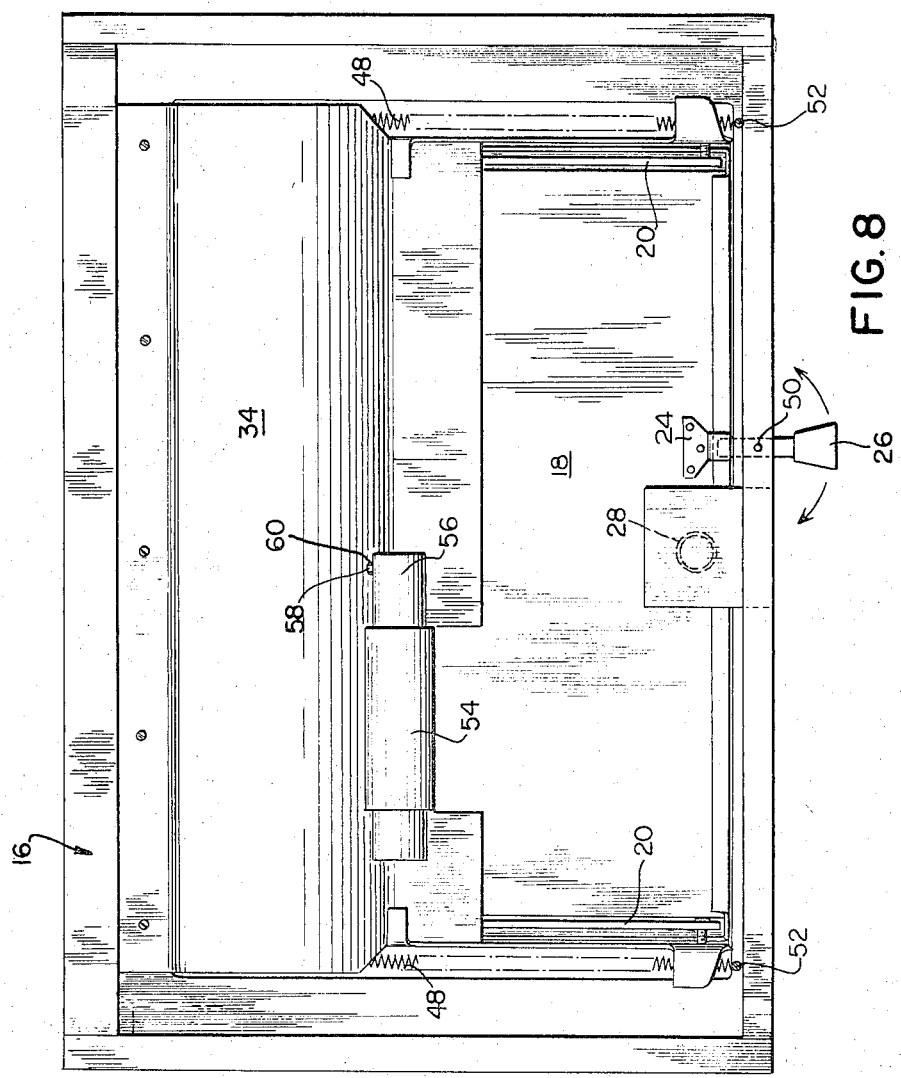

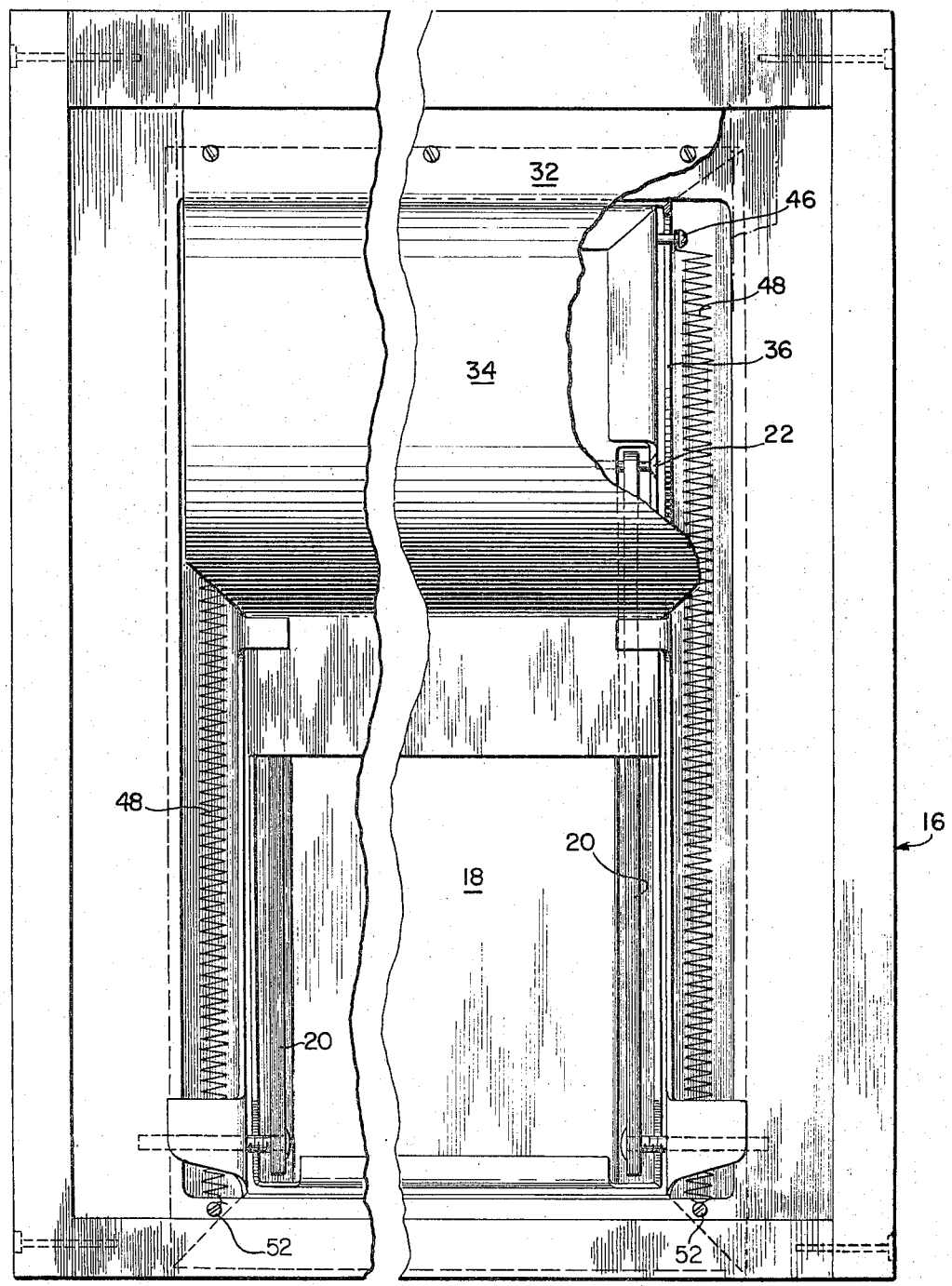

3,421,460
ROBBERY PREVENTION DEVICE

Lawrence B. McKay, Arlington, Va., assignor of thirty-three and one-third percent each to Lola M. McKay, Arlington, and George T. Boswell, Springfield, Va.
Filed Aug. 8, 1967, Ser. No. 659,193
U.S. Cl. 109—11                                   7 Claims
Int. Cl. E06b 3/00; E06b 5/00; E05g 3/00

ABSTRACT OF THE DISCLOSURE

A robbery prevention device for counters and the like having a movable counter portion connected to a fixed counter portion through a movable pivot. The movable portion is biased toward a vertical position to provide a shield for a person standing behind the counter. The movable counter portion is normally stored in a horizontal position flush with the counter and is released by a trigger mechanism actuatable from behind the counter.

Background of the invention

This invention relates generally to robbery prevention devices and more particularly to a protection device for use on counters in establishments such as banks, stores and the like.

The prior art is replete with devices for preventing or discouraging the robbery of banks, stores, or similar establishments. Among such devices, are included apparatus for protecting the teller, storekeeper, or person standing behind a counter by imposing a bulletproof shield between the person behind the counter and the would-be robber upon suitable signal or actuation of a trigger. In accordance with the latter described type of device, several structures have been heretofore provided wherein the bulletproof shield constitutes a portion of the counter and, through various actuating means, the shield may be pivoted from a horizontal to a vertical position to protect the person behind the counter. The prior art devices have one common disadvantage in that the pivotal shield has been mounted in such a manner that, if the would-be robber is aware of its presence, actuation of the shield may be interfered with by downward pressure on the forward edge of the shield prior to or during actuation thereof. Such a disadvantage may be overcome by incorporating powerful hydraulic actuators to pivot the shield with sufficient force to preclude such interference; however, such apparatus would require cumbersome and relatively expensive installation and actuating devices.

Summary of the invention

The invention furnishes a means for prevention of robbery of banks, stores or the like by imposing a weapon and acid-proof shield between a person standing behind a counter and a would-be holdup man. Means are also provided to actuate tear gas or other ordnance simultaneously or sequentially to disable the holdup man physically.

This invention provides a relatively lightweight, inexpensive and easily installed shield device which is actuatable by a simple spring biased or other lightweight means. The invention provides a device which precludes interference in the operation thereof by providing a shield which forms a portion of a counter top and is pivoted in such a manner that actuation thereof to a vertical position may not be restrained by downward pressure on the forward edge of the shield. The shield comprises a frame mounted flat plate having pivotal mountings intermediate the forward and rearward edges and proximate the forward edge thereof. The forward pivotal mounting is provided with cam followers disposed in cam tracks in such a manner that, upon actuation of the device, that mounting moves downwardly and rearwardly away from the forward edge of the frame, thereby effectively preventing interference with the operation of the shield through downward pressure thereon.

The invention may be used as a single unit, multiple units or in a system with other preventative devices.

The objects and advantages of this invention will become better understood to those skilled in the art by reference to the following detailed description when viewed in light of the accompanying drawings wherein like numerals throughout the figures thereof indicate like components and wherein:

Brief description of the drawings

FIGURE 1 is a perspective view of a device in accordance with the invention in an unactuated condition;

FIGURE 2 is a view similar to FIGURE 1 showing the device in an actuated condition;

FIGURE 3 is an enlarged fragmentary perspective view of a portion of the device of FIGURE 1;

FIGURE 4 is an elevational view of the device of FIGURE 1, in section, showing the device in the unactuated condition;

FIGURE 5 is a view similar to FIGURE 4 showing the device in an intermediate position;

FIGURE 6 is a view similar to FIGURE 4 showing the device in the fully actuated condition;

FIGURE 7 is an enlarged fragmentary sectional view of a portion of the device of FIGURES 4 through 6;

FIGURE 8 is a plan view, partly in section, of the underside of a device in accordance with the invention; and FIGURE 9 is an enlarged fragmentary view similar to FIGURE 8.

Description of the preferred embodiment

Turning now to FIGURE 1 of the drawings, a device in accordance with the invention, shown generally at 10, is shown installed in a counter 12 and aligned with a teller's window 14, such as may be found in a typical banking establishment. The device comprises a frame, shown generally at 16, enclosing the edges of a shield 18 and disposed in coplanar relationship with respect thereto. The shield is preferably in the form of a flat plate, however, other configurations, such for example, as arcuate segments, may be utilized. The plate may also be made expansible by incorporating "wing" plates hinged to the side edges thereof, or by attaching parallel planar plates, which are extensible outwardly in slidable relation thereto.

By reference now to FIGURE 2, the device of FIGURE 1 is shown in an actuated condition with the shield 18 disposed substantially normal to the frame 10. The shield 18 is preferably formed of some penetration-resistant material such, for example, as a high carbon steel or the like. As will be described in greater detail below, the shield 18 is connected to the frame 10 through a pivotal mounting which consists, in part, of a pair of arms 20 pivotally connected to the side edges of the shield 18 at 22 intermediate the forward and rear edges of the shield. The arms 20 are pivotally connected, at the other ends thereof, to the frame 16 at a point proximate the rear edge thereof. A catch 24 is disposed on a lower surface of the shield 18 proximate the rear edge thereof and is engaged, when the device is in the condition shown in FIGURE 1, by a trigger or latch 26 pivotally mounted on the frame 16 to retain the shield 18 in coplanar relation to the frame. A coil spring 28 is mounted to the rear edge of the frame 16 and is disposed to engage the lower surface of the shield 18 and provide initial upward bias therefor. In lieu of or in addition to the mechanical catch and trigger mechanism illustrated, solenoid or pneumatically actuated latches, operable from remote stations, may be used where applicable.

As can be best seen by reference to FIGURE 3, the side edges of the shield 18 are provided with cut-out portions 30 which accommodate the arms 20 when the shield is in position shown in FIGURE 1 and thereby allows for coplanar relationship between the shield 18 and the frame 16.

In FIGURE 4 the device is shown in side elevation and in section. In this figure, the shield 18 is in a coplanar relation to the frame 16, compressing the coil spring 28. The frame 16 has mounted, proximate the forward edge thereof, a rearwardly extending plate 32 having a downwardly extending dished out portion 34 attached thereto. A cam plate 36 is mounted on the side members of the frame 16 at either end of the dished out portion of the plate 34. The plate has a cam track 38 formed therein, the track having a cam surface 40 describing a downturned arc for a portion of the length thereof and terminating, at the rear end thereof, in a horizontal portion 42. An upwardly and forwardly extending notch 44 is formed in the rear terminus of the track. A transversely extending cam follower 46 is disposed on each side of the plate 18, proximate the front edge thereof and extends into the cam track 38. Although the cam track 38 is preferably in the form of a downturned arc as illustrated, it should be obvious that other configurations, such as a straight horizontal slot, may be incorporated if so desired.

As is best seen in FIGURES 5 and 6, a tension spring 48 is disposed between the rear edge of the frame 16 and the forward edge of the shield 18 to normally bias the plate 18 toward the rear of the frame. In these figures, certain elements of the structure are omitted, for example, the coil spring 28 in FIGURES 5 and 6, to provide for greater clarity in the description.

FIGURE 7 is an enlarged fragmentary view of the device shown in FIGURES 4 through 6, illustrating in detail the catch 24 and trigger 26 relationship. In this figure, the abutment between the rear edge of the frame 16 and the rear edge of the shield 18 is shown. The trigger 26 is pivotally mounted to the frame 16 through a screw 50 and extends forwardly to engage the catch 24.

FIGURES 8 and 9 illustrate the transverse relationship of the components of the device from underneath the counter. From this view, it is seen that the tension spring 48 is connected at the forward end thereof to the outboard terminus of the cam follower 46 and, at the rearward end thereof, to the frame 16 through a screw 52.

Mounted in a bracket 54, attached to the undersurface of the plate 32, is a tear gas cartridge 56. The cartridge may be of any type standard in the art, and is generally powered by a compressed gas released through a suitable mechanical trigger mechanism on the cartridge. The cartridge 56 is provided with a nozzle 58 which is aligned with an opening 60 in the dished out portion 34 of the plate 32. The disposition of the opening 60 is such that gas is ejected from the cartridge 56 upwardly and forwardly toward a would-be robber when the shield 18 is in the position shown in FIGURE 6. Actuation of the cartridge 56 may be manual either by direct or remote actuation by the operator, or a suitable structure may be provided in the actuating mechanism for the shield 18 to trigger the cartridge when the shield has assumed the normal position shown in FIGURE 6.

In lieu of tear gas, some other ordnance may be substituted if so desired or, a tracer material, such as is well known in the art, may be sprayed on the holdup man for immediate or subsequent identification.

In operation, and with specific reference to FIGURES 4, 5 and 6, the person behind the counter, upon being alerted to an attempted robbery, moves the trigger 26 transversely, as shown by the double headed arrow in FIGURE 8, thereby releasing the catch 24 to allow the rear edge of the shield 18 to be moved upwardly under the influence of the compression spring 28. Upward movement of the rear edge of the shield 18 induces downward movement of the forward edge of the shield and the cam follower 46, at which point the tension of the spring 48 acts to continue movement of the forward edge of the shield downwardly and rearwardly following the path defined by the cam surface 40. Since the arm 20 is fixed in length, such movement of the forward edge of the shield 18 induces an upward movement of the pivot 22 (FIGURE 5) until the components reach the relationship shown in FIGURE 6. With the disposition of the components as shown in FIGURE 6, the cam follower 46 is situated rearwardly of the notch 44 in such a manner that simple backward pressure on the rear edge of the shield 18, such as might be attempted by the would-be holdup man, will move the follower into the notch, thereby precluding collapsing of the shield.

What has been set forth above is intended primarily as exemplary of a teaching in accordance with the invention to enable those skilled in the art in the practice thereof. It should, therefore, be understood that, within the scope of the appended claims, the invention may be practiced other than as specifically described.

What is new and therefore desired to be protected by Letters Patent of the United States is:

1. A robbery prevention device for counters and the like comprising:
   a shield having forward, rearward and side edges thereto;
   a frame corresponding to and confining the edges of said shield;
   at least one arm pivotally connected at one end thereof to said frame proximate the rear edge of said shield and at the other end thereof to said shield intermediate the forward and rearward edges thereof, the disposition of the pivotal connection and the relative dimensions of said arm being such that said shield is pivotable from a coplanar to a normal relation to said frame by rearward movement of said shield with respect thereto;
   at least one cam surface disposed on said frame proximate the front edge of said shield;
   a cam follower mounted proximate the front edge of said shield in engagement with said cam surface to restrict the movement of the front edge of said shield to the path defined by said cam surface;
   biasing means urging said shield rearwardly; and
   a catch and trigger means mounted between said frame and the shield for releasable retention of said shield in a coplanar relation to said frame;
   whereby release of said catch and trigger means permits rearward movement of said shield under the influence of said biasing means for pivoting thereof to a position normal to said frame.

2. A device in accordance with claim 1 wherein one of said arms is connected to each of the side edges of said shield.

3. A device in accordance with claim 1 wherein one of said cam surfaces is disposed on said frame adjacent each of the side edges of said shield.

4. A device in accordance with claim 3 wherein biasing means are further provided on said frame proximate the rear edge of said shield to initially urge the rear edge of said shield upwardly with respect to said frame.

5. A device in accordance with claim 4 wherein said cam surface is in the form of a downturned arc to confine the movement of the front edge of said shield to initial downward movement and terminal upward movement thereof.

6. A device in accordance with claim 5 wherein said cam surface terminates in a cam follower receiving notch to lock said shield in the position normal to said frame against a force tending to pivotally return said shield to a coplanar relationship to said frame.

7. A device in accordance with claim 1 wherein ordnance means are attached to said frame beneath said shield to be uncovered by movement thereof to said position normal to said frame.

References Cited

UNITED STATES PATENTS 1,572,091    2/1926    Smith _____ 109—11
1,682,881    9/1928    Beaudry _____ 109—11

REINALDO P. MACHADO, *Primary Examiner.*